United States Patent [19]

Hayes et al.

[11] Patent Number: 4,796,857

[45] Date of Patent: Jan. 10, 1989

[54] METALLIC SEAL FOR HIGH PERFORMANCE BUTTERFLY VALVE

[75] Inventors: William R. Hayes, Cincinnati, Ohio; Allan K. Shea, Erie, Pa.

[73] Assignee: White Consolidated Industries, Inc., Cleveland, Ohio

[21] Appl. No.: 128,282

[22] Filed: Dec. 3, 1987

[51] Int. Cl.⁴ .................... F16K 1/22; F16K 25/00
[52] U.S. Cl. .................... 251/173; 251/306; 251/360; 251/363; 277/236
[58] Field of Search ............ 251/171, 173, 174, 305, 251/306, 175, 360, 363; 277/236

[56] References Cited

U.S. PATENT DOCUMENTS

| | | | |
|---|---|---|---|
| 3,077,332 | 2/1963 | Burtis | 251/173 |
| 3,282,555 | 11/1966 | Mallonee, II et al. | 251/306 |
| 4,272,054 | 6/1981 | Zinnai | 251/306 |
| 4,293,116 | 10/1981 | Hinrichs | 251/306 |
| 4,410,163 | 10/1983 | Scobie et al. | 251/306 |
| 4,487,216 | 12/1984 | Barker et al. | 251/173 |
| 4,513,946 | 4/1985 | Priese | 251/306 |
| 4,593,916 | 6/1986 | Laulhe et al. | 251/306 |
| 4,676,481 | 6/1987 | Hayes | 251/306 |

Primary Examiner—George L. Walton
Attorney, Agent, or Firm—Pearne, Gordon, McCoy & Granger

[57] ABSTRACT

A high performance butterfly valve utilizing a thin sheet metal annulus to provide sealing between a valve casing and a rotary disc type valving member. The design of the sealing element provides for a self-sealing at all pressures, with augmentation of the sealing action as a result of applied pressure differential. As maximum stresses in the thin metal sealing element are approached, the element becomes supported at an intermediate region, enabling effective performance at both low and high pressure limits.

11 Claims, 2 Drawing Sheets

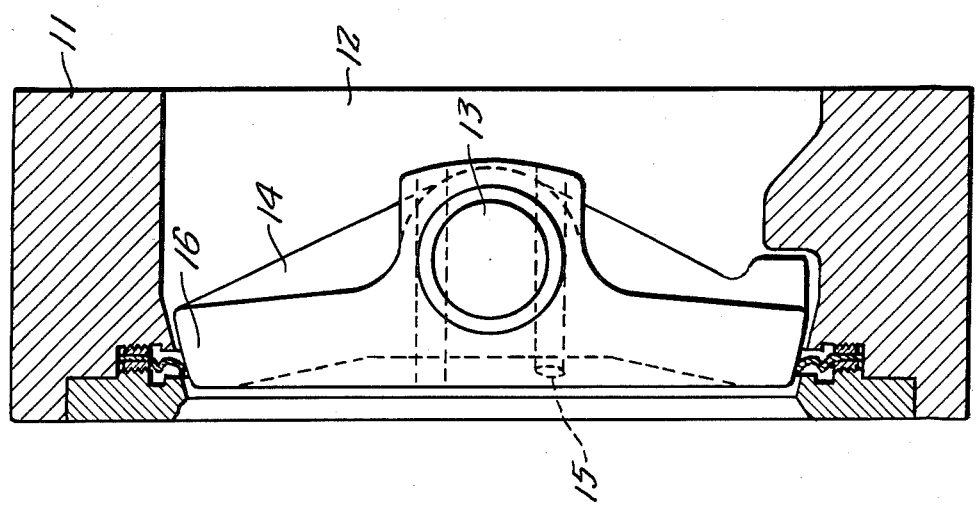
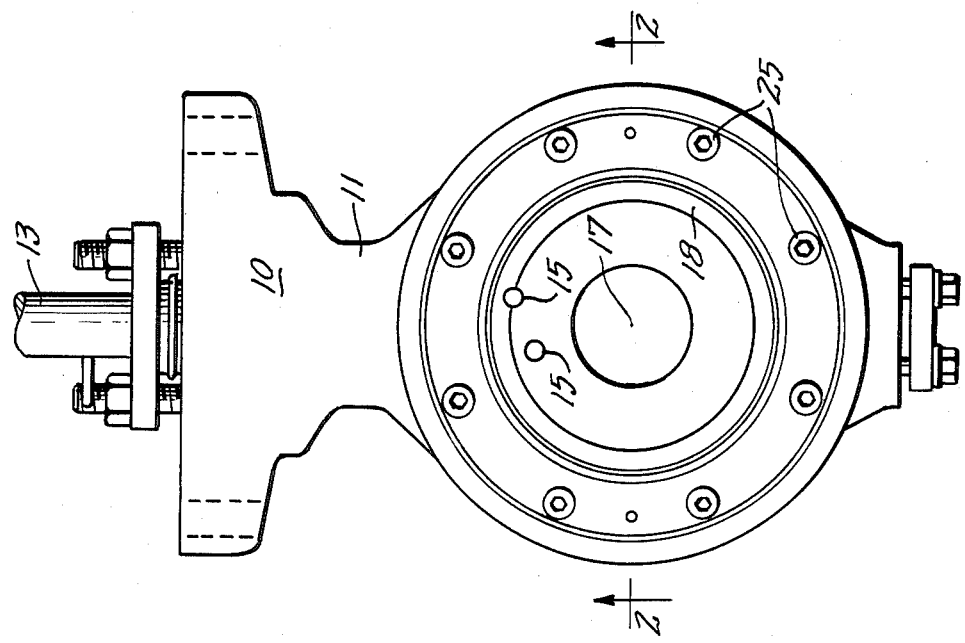

METALLIC SEAL FOR HIGH PERFORMANCE BUTTERFLY VALVE

BACKGROUND AND SUMMARY OF THE INVENTION

The present invention is directed to improvements in valves, particularly butterfly-type valves, but is also applicable to ball valves and the like.

Butterfly valves and ball valves are provided with a movable valve member that rotates within a valve housing, about a diametral axis of the valve passage. In a butterfly valve, the movable valve element typically is in the form of a disc-like member provided on its outer peripheral surface with spherical contours forming a sealing surface. When the valve is fully open, the disc is oriented generally parallel to fluid flow through the passage. In a ball valve, the movable valve member has a generally spherical configuration and is provided with a large central opening. When the opening is aligned with the fluid passage, the valve is fully open. In the closed position, the spherical member is rated 90° to completely block the passage.

Conventionally, a sealing element is provided to form a fluid tight seal between the valve body and the movable disc or ball, when the valve is in a closed position. Typically, the sealing element takes the form of an annular element, fixed in the valve housing in surrounding relation to the movable valving element.

In the William R. Hayes U.S. Pat. No. 4,676,481, assigned to White Consolidated Industries, Inc., there is shown a particularly advantageous form of annular sealing element for butterfly valves. The seal there disclosed is a so-called "soft seal", formed of durable plastic material. The patented seal is highly advantageous for a wide variety of applications. Nevertheless, for certain types of valve service, wherein the valve may be exposed to extremely high temperatures, for example, or to chemicals or solvents that might attack the plastic soft seal, it is advantageous to utilize a seal formed of metallic material. Metallic seals are, in general, well known, examples of such being the Scobie et al. U.S. Pat. No. 4,410,163 and the Barker et al. U.S. Pat. No. 4,487,216, for example. In certain cases, such as in the Barker et al. patent, for example, the metallic seal element functions primarily as a barrier to protect a soft seal. In the Scobie et al. patent, on the other hand, the metallic member is relied upon exclusively for sealing purposes.

In accordance with the present invention, an improved valve arrangement is provided which incorporates an advantageous form of thin metal annulus to provide a highly effective seal between the valve body and the butterfly disc or other movable element. The valve and seal arrangement of the invention incorporate certain unique features enabling highly efficient and reliable sealing to be achieved in a structure of simple and economical design.

In accordance with a specific aspect of the invention, the valve assembly includes a thin annular metal seal whose radially inner surface portions bear sealingly on the spherical outer surfaces of the butterfly disc. Pursuant to the invention, the configuration of the metallic seal element is such that the fluid pressure on the upstream side of the valve urges the inner portions of the seal in a closing direction against the surface of the butterfly disc. The configuration of the seal and of the valve housing, importantly is such that, as upstream pressures increase to the point of maximum desired stress in the thin metal sealing element, deflection of the element causes it to be supported in a region shifted radially inward from its original support, whereby the increased upstream pressure of the fluid may be effectively resisted without overstressing the material of the seal. The construction enables the seal to be of lightweight, flexible construction, so as to provide highly effective sealing even at low pressure differentials.

In accordance with another aspect of the invention, the construction of the valve and metallic seal is such that the seal relies only upon its own flexibility and the action of the pressure differential between the upstream and downstream sides of the valve for sealing effectiveness. It is neither necessary nor desirable to provide auxiliary devices, such as springs, annular tension windings, or the like to achieve reliable sealing contact. Rather, the design relies upon a relatively high degree of flexibility of the metallic seal element itself to establish an initial, low pressure seal. As the fluid pressure differential in the valve increases, the geometry of the valve and seal causes the fluid pressure to be applied to the seal, increasing its sealing effectiveness. The construction assures reliable and effective sealing, yet also minimizes wear on the relatively moving parts of the valve in the area of the seal.

For a more complete understanding of the above and other features and advantages of the invention, reference should be made to the following detailed description of a preferred embodiment and to the accompanying drawings.

DESCRIPTION OF THE DRAWINGS

FIG. 1 is an elevational view of a typical form of butterfly valve, incorporating the invention, viewed from the upstream or high pressure side.

FIG. 2 is an enlarged cross sectional view as taken generally on line 2—2 of FIG. 1.

DESCRIPTION OF A PREFERRED EMBODIMENT

Figure 4:
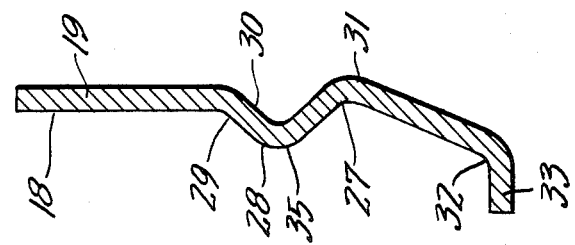
FIG. 4 is an enlarged cross sectional view of a thin metallic seal element according to the invention.

Referring now to the drawing, the reference numeral 10 designates in a general way a butterfly valve of a high performance type. The valve typically includes a valve casing 11 provided with a generally cylindrical central through passage 12 for accommodating the flow of fluid. The casing 11 rotatably supports a control shaft 13, which extends through the flow passage 12 on a diametral axis. A disc-like valving element 14 is fixed to the shaft 13, as by tapered pins 15, for rotation with the shaft.

Valves of the type described above are, in general, well known. Representative of such is the William R. Hayes U.S. Pat. No. 4,676,481, assigned to White Consolidated Industries, Inc., the disclosure of which is hereby incorporated by reference.

In accordance with known construction principles for high performance butterfly valves, the disc-like valving member 14 is asymmetrically mounted in relation to the control shaft 13, so that the disc lies principally upon one side of the shaft. In the illustrated form of valve, the design is intended for a unidirectional orientation in the fluid flow line, so that the left side of the valve, as viewed in FIG. 2, is exposed to the upstream or high pressure side of the fluid system. While the right hand or shaft side of the disc is exposed to the downstream or low pressure side of the fluid flow system.

As reflected in FIG. 2, the outer peripheral surfaces 16 of the valving member are generally spherically contoured, with the center point lying along the axis of the shaft 13, at the center 17 of the flow passage. Accordingly, when the control shaft is rotated, the disc pivots about the center of the shaft 13, and the outer peripheral surfaces 16 of the valving member move in a generally spherical path. Typically, the controlled movements of the shaft 13 encompass a range of about 90°, with one limit position being substantially as shown in FIG. 2, wherein the disc is in a valve-closing position, and the other limit being 90° clockwise from that shown in FIG. 2, wherein the disc is aligned more or less parallel to the axis of the flow passage through the valve casing 11.

In order to effect a high performance seal between the valve casing 11 and the disc-like valving element 14, there is provided an annular sealing element 18 (see FIG. 3) which surrounds the spherical outer surface portions 16 of the valving member in its closed position. Radially outer portions of the sealing member are firmly anchored to and in sealed relation with the valve casing 11, while radially inner portions 20 of the sealing element are arranged to have sliding/sealing contact with the spherically contoured outer surfaces 16 of the valving member 14.

For many purposes, the sealing element 18 may be formed of a "soft" pliable plastic material, such as Teflon fluorocarbon. However, for certain classes of service, involving high temperature fluids and/or working conditions, or chemicals or solvents of a character likely to attack plastic sealing elements, it is necessary or appropriate to utilize metallic sealing elements. The sealing element 18 of the ilustrated structure is such a metallic element, and it is designed, constructed, and incorporated with the valve housing and valving element in such a manner as to achieve significantly superior performance for a metallic sealing element.

To advantage, the metallic seal element 18 of the invention is an annular stamped section of thin sheet metal material, such as stainless steel. The sheet metal material is relatively thin in relation to its radial dimensions. By way of example, for a four inch valve rated at 150 psi, the sheet metal thickness may be approximately 0.018 inches, while the unsupported (cantilevered) radially inwardly extending portions of the seal may have a length of about 0.396, providing a ratio of unsupported length to thickness of approximately 22. Of course, the thickness dimension may vary as well as the unsupported length to thickness ratio, depending on the size of the valve and the pressures which it is designed to withstand in service. In general, the lower the intended loading, the thinner the material in relation to its unsupported length, in order to retain flexibility of the material and to assure proper sealing at low pressures.

In the illustrated form of the invention, the radially outermost portions 19 of the metal annulus 18 are tightly gripped between two opposed annular gasket members 21, 22. The gasket members, together with the outer margins 19 of the seal, are clamped by means of a clamping ring 23 received in a recess 24 in the upstream face of the valve casing 11 and secured tightly thereto by means of a plurality of bolts 25. The material of the gaskets 21, 22 is of a relatively tough, substantially rigid nature so that the outer portions 19 of the metallic annulus are firmly positioned in the valve housing. The valve casing 11 and the clamping ring 23 are so contoured, in regions adjacent to the inner annular margins of the seal 18, as to provide clearance space and permit relatively free movement of the sealing member, within limits. The valve casing is, however, provided with an annular shoulder 26, spaced radially outward a predetermined distance from the outer peripheral surface 16 of the valving disc and arranged for cooperation with a fulcrum portion 27 of the sealing element, in a manner to be more fully described.

With reference to FIG. 4, illustrating the contours of the metallic sealing element in cross-section, the mounting portion 19 is shown to be generally flat and joins at its radially inner extremity with an annular ridge 28, which projects in an upstream direction for a short distance, and then returns to merge with the fulcrum portion 27. By way of illustration, in a sealing element intended for a four inch, 150 pound psi valve, the mounting portion 19 may have a length of about 0.164 inches. The upstream projection 28 may comprise a series of connected bends having radii of approximately 0.23 inches. The first such bend 29, constituting the radially outermost unsupported poriton of the seal, may cover an arc of about 45°. A second and oppositely directed bend 30 may cover an angle of about 90°. The final bend 31 of the projection may cover an angle of approximately 77° providing, radially inward of the third bend 31, a relatively flat portion projecting inward and somewhat in an upstream direction at a slight (e.g., 22°) angle to the plane of the mounting section 19. At its innermost extremity, the sealing element is formed with a bend of about 0.015 inch radius joining a guide foot 33, extending a short distance (e.g., 0.030 inches) in an upstream direction.

Figure 3:
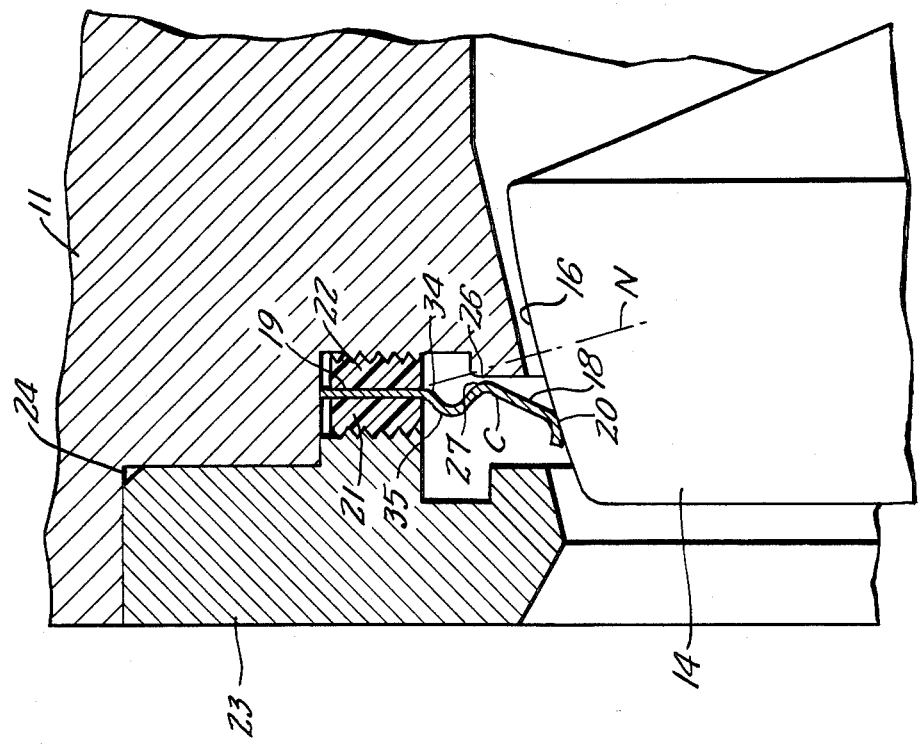
FIG. 3 is a highly enlarged, fragmentary cross sectional view showing a portion of the subject matter of FIG. 2, with particular emphasis of the metallic seal configuration of the invention.

In accordance with the invention, the metallic sealing element 18 is designed to have self-pressed sliding/sealing contact with the outer surfaces 16 of the valve disc. To accomplish this, the mounting and location of the annular seal is such that when the valve disc 14 is in its closed position, as shown in FIGS. 2 and 3, the radially inner extremities of the sealing annulus 18 are at least slightly displaced radially outward and in an upstream direction by the outer surface of the valving disc 14. For example, in the illustrated example valve, being nominally a four inch valve for 150 psi service, the innermost diameter of the annular sealing element may be approximately 3.891 inches in diameter, and the diameter of the valve disc, at the plane P where it contracts the sealing ring 18, is a few thousandths larger. In this respect, it is to be noted that the contact between the valve disc 14 and the sealing ring 18 does not take place at a place of maximum disc diameter, but at a location displaced upstream from the maximum diameter.

The design of the valve is such that, by merely closing the valve disc, in the absence of the effect of any fluid pressure, the sealing annulus 18 acts, through its own resilience, to provide a fully effective seal. In addition, the configuration of the parts is such that, when a pressure differential exists between the upstream and downstream sides of the closed valve disc, the pressure differential acts upon the sealing annulus in a manner to increase the sealing effectiveness correspondingly. To this end, the region 20 of sliding contact between the inner portions of the sealing element and the outer surfaces of the valve disc is displaced in an upstream direction from a line "N", normal to the spherical outer surface of the valve disc, projected to the outermost, unsupported extremity 34 of the sealing element. With this arrangement, a pressure differential acting in the upstream-to-downstream direction on the sealing element 18 will always tend to press the sealing element contact point 20 more tightly into contact with the surface of the valving disc 14.

A substantial degree of flexibility of the sealing element 18 is important to achieve self-pressed effective sealing at very low operating pressures, avoiding the necessity of providing auxiliary means, such a springs, tension wires, or the like, to augment the normal action of the sealing element. To this end, maximizing the ratio of unsupported length to thickness of the sealing element is a desired objective. To achieve the above objective without compromising performance of the valve at its designed upper pressure limits, the configuration of the sealing element 18 and the valve casing 11 is such that the annular abutment surface 26 is initially spaced slightly downstream from the downstream-facing fulcrum surface 27. Thus, initially, the sealing element is unsupported from the region 34 immediately adjacent the mounting gaskets 21, 22 for maximum flexibility. However, as the pressure differential in the valve increases to a predetermined level, say approximately one-half the maximum design pressure to which the valve is intended to be exposed, the unsupported portions of the sealing element will be caused to deflect sufficiently to cause the fulcrum surface 27 to contact the abutment 26 and thereafter be rigidly supported thereby.

The initial clearance C existing between the fulcrum surface 27 and the abutment surface 26, with the valve in the closed position and with no pressure differential, may have to be empirically determined in individual cases, so that initial contact will be established at a desired pressure level (e.g., one-half max designed pressure). In the typical example of a four inch, 150 psi valve, the initial clearance may be on the order of 0.006 inches.

As will be evident in FIG. 3 of the drawings, when the pressure differential across the valve has increased sufficiently to deflect the sealing element 18 into contact with the abutment surface 26, the fulcrum surface 27 of the sealing element becomes rigidly supported against the valve casing. Further, the configuration of the sealing element 18 and the associated valve structure is such that the area 20 of sealing contact is located upstream of a line (not shown, but adjacent to the line "N") normal to the valving surface 16 and projected to the pivot area between the fulcrum surface 27 and the abutment surface 26. Accordingly, the geometry of the valve continues to be such that unbalanced pressure in the valve tends to augment the normal sealing action of the sheet metal sealing element 18. When the fulcrum portion becomes seated against the abutment 26, the ratio of unsupported length to thickness of the sealing element is substantially reduced, as is both appropriate and desirable in view of the increased pressure differential to which the sealing element is exposed.

Advantageously, the sealing element is configured, in the region between the fulcrum point 27 and the outermost unsupported area 34, to provide a single, rib-like projection 35, which is convex in the upstream direction. This single rib 35 spans substantially the entire distance from the fulcrum portion 27 to the region 34 adjacent to the mounting gaskets 30, 31. Accordingly, when the valve is operating under the higher ranges of designed pressure differentials, and the fulcrum portion is seated against the abutment 26, the single rib-like projection 35 serves to resist excessive deflection of this radially outer region of the sealing element.

By providing an annular rib 35, projecting in the direction of pressure, as pressure is increased when section 31 is in contact with surface 26, the outer portion of the sealing member exerts a slight inward force on the sealing member from point 31 to contact point 20. This will assist in providing the necessary sealing force as differential pressure across the seal goes up and will also help to compensate for deformation in the sealing member from point 31 to 20 that may occur because of increasing pressure on the annular section. The annular rib projection also provides additional stiffness or moment of inertia to the metal section, thereby permitting a much thinner, more flexible section to be used than would otherwise be possible.

The described valve construction provides for significantly enhanced performance of rotary valves using thin metallic seals. The arrangement of the invention provides for a metallic seal of a relatively simplified yet uniquely effective configuration, which is able to function exclusively by virtue of its own resilience, augmented by fluid pressure of the system being controlled. The design of the valve and seal are such that, when the valve is closed but no pressure is acting on the valve, there is minimal yet effective sealing contact between the sealing element and the valving surface. As pressure differential increases, it operates, by virtue of the unique geometry of the inventive structure, to augment the sealing pressure for increased sealing effectiveness.

In order to maintain a relatively high degree of flexibility of the metallic sealing element, the structure of the invention is designed to provide a relatively large ratio of unsupported length (in the cross sectional configuration) to thickness, and a ratio in excess of 20, for example, can be provided in a four inch, 150 psi valve, utilizing a thin stainless steel sealing element. This relatively large ratio of unsupported length to thickness accommodates easy flexing of the sealing element as is desired at low working pressures. By providing for an intermediate support of the sealing element, in the form of a rigid abutment surface on the valve casing, which is normally spaced slightly downstream from the fulcrum surface 27, the sealing element becomes supported at an intermediate area when the working pressure reaches a predetermined intermediate level. Desirably, this is designed to provide intermediate support of the sealing element 18 while the stresses therein remain well below critical levels.

Significantly, the sealing element of the invention operates with a high degree of effectiveness without utilization of auxiliary means, such as springs or tension windings for augmentation of the sealing action of the thin metal sealing annulus. This not only provides for a more reliable and effective sealing action, but reduces unnecessary wear upon the critical valve parts.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. In a valve of the type having a casing provided with a through passage for fluid, a rotatable valving member supported in said passage for rotational movement between valve-closed and valve-open positions and having spherical outer surface portions forming a sealing surface, and an annular seal mounted in said casing and surrounding said valving member and contacting said sealing surface in the valve-closed position of said valving member, the improvement characterized by
   (a) said flexible annular seal being of thin sheet metal construction and having its radially outer annular edge portions clamped in sealed relation to said valve casing, in a mounting plane transverse to said passage,
   (b) said flexible annular seal having its radially inner annular portions arranged to have self-pressed, resilient wiping contact with the spherical outer surface portions of said valving member in its valve-closed position in order to establish a low pressure fluid seal between the higher pressure (upstream) and lower pressure (downstream) sides of said valve casing,
   (c) the radially inner annular portions of said flexible annular seal extending in inclined relation to said spherical outer surface portions and contacting said surface portions in regions thereof offset in an upstream direction from the intersection with said surface portions of a line normal to said spherical outer surface portions and projected to the radially outermost unsupported portions of said flexible annular seal, whereby upstream fluid pressure acting upon unsupported portions of said annular seal tends to press it more tightly against the spherical outer surface portions of said valving member,
   (d) said flexible annular metal seal being initially unsupported for a substantial distance radially outward from the spherical outer surface portions of said valving member to accommodate flexing of radially intermediate portions of said annular seal,
   (e) said casing having an annular abutment positioned on the downstream side of said flexible annular seal and adapted, upon predetermined deflection of the unsupported seal portions in a downstream direction in response to increasing pressure differential, to engage and support an intermediate annular support region of the previously unsupported flexible seal portions.

2. The valve improvement of claim 1, further characterized by
   (a) unsupported annular portions of said flexible annular metal seal located radially outward of said annular support region being formed with a single annular ridge projecting in an upstream direction and substantially spanning the radial distance from said intermediate annular support region to the region of clamping said annular seal in said casing.

3. The valve improvement of claim 1, further characterized by
   (a) portions of said flexible annular metal seal extending radially inward from said annular support region being inclined in an upstream direction relative to said normal line whereby, when said seal is supported at said annular support region, the radially inner annular extremities of said seal are urged by upstream pressure toward the spherical outer surface portions of said valving member.

4. The valve improvement of claim 1, further characterized by
   (a) the radial length of the normally unsupported, radially inner annular portions of said flexible metal seal constituting a large multiple of the thickness of the metal material of the seal.

5. In a valve of the type having a casing provided with a through passage for fluid, a rotatable valving member supported in said passage for rotational movement between valve-closed and valve-open positions and having spherical outer surface portions, and an annular seal mounted in said casing and surrounding said valving member in its valve-closed position, the improvement characterized by
   (a) said annular seal being of relatively thin flexible sheet metal construction,
   (b) outer annular portions of said seal being secured in fixed and sealed relation to said valve casing,
   (c) an intermediate annular portion of said seal having a fulcrum portion spaced radially inward from said outer annular portions,
   (d) said valve casing having an annular abutment surface on the downstream side of said flexible annular seal, spaced a short distance downstream from said fulcrum portion,
   (e) said flexible annular seal having an inner annular portion extending in an inclined relation from said fulcrum portion in a direction radially inward and upstream relative to the direction of fluid flow passage,
   (f) said inner annular portion having an annular contact portion forming a sealing surface and having self-pressured wiping contact with said spherical outer surface portions,
   (g) said sealing surface being located upstream from said fulcrum portion and upstream from the outer annular portions of said flexible seal and inclined relative to a line normal to said spherical outer surface portions, whereby higher pressures on the upstream side of said valve tend to enhance the sealing action of said seal,
   (h) said fulcrum portion being spaced from said abutment surface when said seal is subjected to pressure differentials below a predetermined level, and engaging said abutment surface at pressures above said predetermined level.

6. The valve improvement of claim 5, further characterized by
   (a) said fulcrum portion being located generally midway between said outer annular portions and said sealing surface.

7. The valve improvement of claim 6, further characterized by
   (a) the unsupported annular regions of said flexible seal radially outward of said fulcrum portion being formed as a single annular ridge-like portion projecting in an upstream direction in its mid region.

8. The valve improvement of claim 5, further characterized by
   (a) said valving member being in the form of a disc,
   (b) said disc being mounted for rotating movement about an axis located on the downstream side of said disc,
   (c) the spherical outer surface portions of said disc comprising frustospherical peripheral surface areas of the disc facing generally outward and in the upstream direction.

9. In a rotary valve of the type having a valve casing provided with a flow passage, a rotary valve element having a spherical outer surface portion forming a valving surface, and an annular sealing element formed of a thin flexible sheet material having an outer annular portion mounted in said valve casing and having a radially inwardly extending annular portion arranged for sealing contact with said valving surface when said valving element is in a valve-closing position, the improvement characterized by (a) said flexible sealing element being inclined in an upstream direction in relation to a line normal to said valving surface and projected toward said outer annular portion, whereby the area of sealing contact between said flexible sealing element and said valving surface are so positioned in relation to the mounted outer annular portion of said sealing element that a fluid pressure differential across said valve will tend to urge said area of contact into increased sealing contact with said valving surface,
 (b) said area of sealing contact being urged against said valving surface substantially exclusively by the resiliency of said sealing element and said pressure differential,
 (c) said valve casing being provided with an annular abutment surface located intermediate the area of sealing contact and the mounted outer annular portion of said flexible sealing element and being normally spaced downstream from a confronting surface portion of the latter,
 (d) said confronting surface portion forming a fulcrum portion,
 (e) said flexible sealing element being deflectable under fluid pressure to move said fulcrum portion into contact with said abutment surface,
 (f) said area of sealing contact with said valving surface and said fulcrum portion being so arranged and disposed that a fluid pressure differential across said valve will tend to urge said area of sealing contact into increased sealing contact with said valving surface when said fulcrum portion is seated against said abutment surface.

10. A valve according to claim 9, further characterized by
 (a) said flexible sealing element having a ratio of unsupported cross-sectional length to thickness of about 20 or more, and
 (b) said flexible sealing element being provided, in the annular region between said fulcrum portion and said outer annular portion, with a single rib-like deformation, projecting in an upstream direction and substantially spanning the distance between said abutment surface and said outer annular portion.

11. A valve according to claim 10, further characterized by
 (a) said abutment surface being so arranged and positioned in relation to said flexible annular sealing element as to be contacted by said sealing element while bending stresses in said sealing element remain below a predetermined safe level.

* * * * *